United States Patent [19]
Sickafus

[11] Patent Number: 5,412,265
[45] Date of Patent: May 2, 1995

[54] PLANAR MICRO-MOTOR AND METHOD OF FABRICATION

[75] Inventor: Edward N. Sickafus, Grosse Ile, Mich.

[73] Assignee: Ford Motor Company, Dearborn, Mich.

[21] Appl. No.: 43,956

[22] Filed: Apr. 5, 1993

[51] Int. Cl.$^6$ ........................... H02K 1/06; H02K 3/00
[52] U.S. Cl. ...................... 310/40 MM; 310/DIG. 6; 310/254; 310/268
[58] Field of Search ............ 310/40 MM, DIG. 6, 42, 310/254, 261, 267, 268, 269, 273, 309

[56] References Cited

U.S. PATENT DOCUMENTS

| | | | |
|---|---|---|---|
| 4,351,653 | 9/1982 | Becker et al. | 55/394 |
| 4,493,753 | 1/1985 | Becker et al. | 204/9 |
| 4,551,157 | 11/1985 | Becker et al. | 55/17 |
| 4,563,251 | 1/1986 | Becker et al. | 204/6 |
| 4,658,162 | 5/1987 | Koyama et al. | 310/68 R |
| 4,661,212 | 4/1987 | Ehrfeld et al. | 204/11 |
| 4,677,332 | 6/1987 | Heyraud | 310/184 |
| 4,693,791 | 9/1987 | Becker et al. | 204/11 |
| 4,694,548 | 9/1987 | Ehrfeld et al. | 29/157 C |
| 4,698,285 | 10/1987 | Ehrfeld et al. | 430/5 |
| 4,705,605 | 11/1987 | Becker et al. | 204/11 |
| 4,726,936 | 2/1988 | Erdt et al. | 422/159 |
| 4,738,010 | 4/1988 | Ehrfeld et al. | 29/149.5 R |
| 4,740,410 | 5/1988 | Moller et al. | 428/133 |
| 4,744,863 | 5/1988 | Guckel et al. | 156/653 |
| 4,784,935 | 11/1988 | Ehrfeld et al. | 430/321 |
| 4,797,211 | 1/1989 | Ehrfeld et al. | 210/321.84 |
| 4,853,669 | 8/1989 | Guckel et al. | 338/4 |
| 4,872,888 | 10/1989 | Ehrfeld et al. | 55/16 |
| 4,897,360 | 1/1990 | Guckel et al. | 437/7 |
| 4,990,827 | 2/1991 | Ehrfeld et al. | 313/533 |
| 4,996,082 | 2/1991 | Guckel et al. | 427/99 |
| 5,013,693 | 5/1991 | Guckel et al. | 437/248 |
| 5,028,875 | 7/1991 | Peters . | |
| 5,054,522 | 10/1991 | Kowanz et al. | 137/625.33 |
| 5,129,983 | 7/1992 | Greiff | 156/628 |
| 5,191,251 | 3/1993 | Paratte | 310/309 |

OTHER PUBLICATIONS

Sickafus, "New Microfabrication Technology", vol. 1, No. 3, Highlights, 1992, pp. 2–6.
"Application of the Liga Technique for the Development of Microactuators Based on Electromagnetic Principles," H. Lehr et al. 0960–1317/92/040229, c. 1992 IOP Publishing Ltd. pp. 229–234.
Wagner et al. (1992) Micro Electro Mechanical Systems, '92 Conference Proceedings, "Linear and Rotational Magnetic Micromotors Fabricated using Silicon Technology".
Peters (1989) Rev. Sci. Instr. 60: 2789–2793.
"M–S Specification" (1990) Microtechnique Switec 1–5, 1.
"The Liga Technique" (1990) Micromechanics Europe Tech. Digest.
Frazier et al (1992) Micro Electro Mech. Systems Conference.
Engelmann, et al (1992) Micro Electro Mech. Systems Conference.

Primary Examiner—Kristine L. Peckman
Assistant Examiner—D. R. Haszko
Attorney, Agent, or Firm—Allan J. Lippa; Roger L. May

[57] ABSTRACT

A planar micro-motor and method of fabricating it are disclosed. The planar micro-motor comprises a stator supported by the substrate and preferably comprising a plurality of circumferentially spaced micro-coils lying in a first plane. The micro-motor also has rotor comprising a plurality of magnetic regions circumferentially spaced about a shaft for rotation in a second plane parallel to, and spaced from, the first plane. Actuating elements selectively energize subsets of the micro-coils to generate electromagnetic fields acting on the magnetic regions of the rotor across the planar gap sandwiched between the micro-coils and the rotor. The amount and direction of rotation of the rotor can be controlled. The planar micro-motor can be employed as a stepper motor. It can be fabricated using microfabrication techniques.

18 Claims, 9 Drawing Sheets

PLANAR MICRO-MOTOR AND METHOD OF FABRICATION

INTRODUCTION

The present invention is directed to a micro-motor, more particularly to a planar micro-motor and to microfabrication thereof. The planar motor has a planar stator and a parallel, aligned, planar rotor with force generating magnetic fields applied across the planar gap separating the stator and rotor.

BACKGROUND OF THE INVENTION

Microfabrication techniques have long been known to those skilled in the art for production of microelectronic circuits. More recently, such microfabrication techniques have been applied in the production of three dimensional mechanical microdevices for applications, for example, in the fields of micro-optics, mechanical and medical engineering and the like. Using such techniques, microstructures can be fabricated comprising a variety of materials in meeting conductivity and other functional requirements. Microdevices are possible, for example, comprising nickel or nickel-cobalt components for high mechanical stability. Biocompatible materials can be incorporated for biomedical devices. Ceramics also can be incorporated. Opportunities in automotive applications have been identified for miniature motors. Miniaturization offers improved packaging and cost reduction opportunities.

Technologies for microfabrication and the associated miniature devices often are referred to as MEMS for microelectromechanical systems. MEMS technologies include those that employ the thin-film deposition and patterning procedures of the silicon electronics industry. Cost efficiencies can be achieved through batch processing of silicon wafers. MEMS techniques have been used, for example, in bulk micromachining of pressure sensors and accelerometers. More recently, thin films of polycrystallize silicon supported on a sacrificial layer have been used to produce even smaller versions of such devices. Miniature electrostatic motors and electrically driven actuators also have been fabricated using MEMS. A new microfabrication technology known as LIGA (a German acronym taken from words referring to lithography, electroplating and injection molding) expands MEMS to designs based on plastics, metals, alloys and ceramics. LIGA also supports batch processing and uses all of the thin-film technologies of the silicon-based electronics industry. A common denominator of LIGA and silicon micromachining is that both processes typically begin with a photolithography step. In LIGA a two-dimensional pattern is projected into a thick polymer film forming a latent image. This image is then developed by chemical removal of the exposed regions leaving a three-dimensional structure having patterned features with relatively high aspect ratio: wall height divided by feature width. Surface micromachining of poly-Si typically produces features with minimum widths of 1 to 2 microns ($\mu$m) and equivalent heights; giving aspect ratios of unity. In the LIGA process minimum feature sizes of 2 $\mu$m width by 300 $\mu$m height are typical; thus obtaining aspect ratios on the order of 100.

The LIGA process has been commercialized by MicroParts, GmbH (Karlsruhe, Germany), through an association with the Karlsruhe Nuclear Research Center, and has been used to make microdevices with movable parts, for example, microturbines, movable spring elements and acceleration sensors with stationary electrodes and movable seismic mass members. Other exemplary devices produced using such technologies include: a microturbine with a 150 $\mu$m diameter rotor; micro-electrostatic motor with 0.6 mm rotor diameter; an electrostatic linear actuator; optic fiber multiplexer/demultiplexer with 10 fibers; copper coils with 20 $\mu$m by 100 $\mu$m conductors wound with 20 $\mu$m spacings; 12-tooth gears 80 $\mu$m in diameter by 140 $\mu$m height with 28 $\mu$m center bore, pulleys, pulley-belts, assembled gear trains and clamps.

Other MEMS technologies applicable to the present invention include those referred to as MPP-MEMS ("micropatterned polymers for MEMS"). Instead of using PMMA resist and synchrotron exposures as in LIGA, the MPP-MEMS approach is to use a photosensitive polyimide as the resist and expose it with ultra violet light. Electroforming is then used to form devises and features in the patterned polyimide. The minimum feature size typically is not as small as in LIGA and the aspect ratio not as high.

The importance of microfabrication is increasing along with general miniaturization trends and a growing need to integrate mechanical, electronic and optical components into microsystems. The present invention provides a planar micro-motor which can be fabricated using known microfabrication techniques, such as those mentioned above, and can be employed as a component of a larger assembly, even being integrated with microcircuitry and other system components.

SUMMARY OF THE INVENTION

In accordance with the present invention, a planar micro-motor comprises a stator supported by a substrate and comprising electromotive force means arrayed in a first plane for receiving electrical current to selectively generate electromagnetic fields. The electromotive force means preferably comprises a plurality of micro-coils circumferentially spaced in a plane about a center point. A rotor means comprises a planar rotor body aligned over the electromotive force means in a second, parallel plane. It is rotatable in the second plane in response to the electromagnetic fields generated by the electromotive force means and applied across the planar gap sandwiched between them. Preferably, the rotor means further comprises a rotor shaft having a longitudinal axis of rotation intersecting the plane of the micro-coils through aforesaid center point. The rotor means further comprises a plurality of magnetic regions, each comprising, for example, an isolated body of ferromagnetic material. The magnetic regions are circumferentially spaced in the second plane above the stator. Energizing means are provided for selectively passing electrical current from a suitable source to the micro-coils. Such energizing means typically comprises at least electrically conductive leads to the micro-coils. Typically, the micro-coils are energized, either individually or in subsets, in a pre-selected or otherwise controlled sequence, to generate electromotive forces acting on corresponding magnetic regions of the rotor across the planar gap sandwiched between the planar rotor and the planar stator. By controlling the sequence and duration of energizing each micro-coil, the amount, direction and speed of rotor body rotation can be controlled.

The planar micro-motor of the invention can be fabricated through the use of well known techniques and materials. According to a method aspect of the invention, such known techniques and materials are applied in a novel layer-upon-layer microfabrication process. Preferred embodiments of the method of the invention employ multiple photoresist layer processing and "vias," as further described below.

The energizing means optionally may also comprise circuitry means to control the duration and sequence of micro-coil actuation to control, in turn, the direction and degree of rotation of the rotor. The planar micro-motor may be employed, for example, as a stepper motor. An indicator means, for example, a visible flag or mark carried on the rotor shaft, may be used to indicate a gauge reading, system condition or the like. These and additional features and advantages of the invention will be further understood from the following detailed discussion of certain preferred embodiments.

BRIEF DESCRIPTION OF THE DRAWINGS

Certain preferred embodiments of the invention are described and discussed in detail below in association with the appended drawings wherein.

References to direction and position, unless indicated otherwise, refer to the orientation in which micro-motor features are illustrated in the drawings. It should be understood that micro-motors of the invention can be reasonably adapted for use in any orientation, including use in changing orientations.

DETAILED DESCRIPTION OF CERTAIN PREFERRED EMBODIMENTS

The planar micro-motor of the invention may readily be fabricated with features having dimensions of the order of 20 microns. Minimum features sizes in preferred embodiments, typically, are of the order of 10 microns. The preferred planar design includes a stator comprised of micro-coils arranged in a plane, with a rotor suspended above the micro-coils. The micro-coils may have a variety of configurations, optionally being curved or polygonal in shape, with one or more windings. The rotor preferably has an array of magnetic regions positioned on or in a rotor body such that at least one is always sufficiently near a micro-coil to experience the electromagnetic field generated when that micro-coil is energized. The magnetic regions of the rotor body may be formed of permanent magnets, which offer advantages in tailoring the shape and intensity of the magnetic field energy density and, hence, the driving force for the planar micro-motor. This may, however, in certain embodiments, introduce the necessity of shielding external electromagnetic field. The magnetic regions can be made of ferromagnetic material or magnetic materials other than ferromagnetic materials can be used, typically with weaker resulting rotational forces. Variable reluctance micro-motors (having magnetically soft material such as iron rather than permanent magnets) are provided in accordance with alternative embodiments of the invention. The rotor body preferably is carried on a rotor axle or shaft. Upon electrically energizing the micro-coils, the resulting electromagnetic field generated around the energized coils acts on the magnetic regions of the rotor body. Gradients in the resulting field pattern give rise to electromotive forces that turn the rotor on its axle as the magnetic regions of the rotor are attracted to (or repelled from) the micro-coils.

More specifically, starting and driving the planar micro-motor consists of sequentially energizing less than all of the micro-coils, such that one or more magnetic regions of the rotor are attracted toward the center of its adjacent coil. Energizing periods may consist of periodic applied voltages of various wave forms, including pulse strings patterned to achieve the desired energizing current. Such timing schemes are applicable over a broad frequency range up to a point at which the inertia of the system limits the ability of the rotor to keep up with the energizing frequency. The energizing voltage is cycled (or pulsed) with a phase and duration adapted to induce rotation in the desired direction. That is, a micro-coil which is in the correct position relative to a magnetic region of the rotor to cause an attractive force in the desired direction is energized and relaxed in sufficient time to avoid slowing the rotor rotation after the magnetic region passes the angle of maximum force for that micro-coil. Similarly, proper phasing of the energizing voltage can be used to slow and/or stop the rotor.

Rotational motion of the rotor, including direction and amount of rotation, can be controlled with a high degree of precision by controlling the sequence and duration of micro-coil energization. That is, rotation can be sustained for a desired period of time, and otherwise controlled, by selecting an energization sequence and periods of energization of the individual micro-coils to produce the desired time sequence of rotational forces acting on the rotor. The sense of the sequence pattern determines the direction of rotation. In light of these features, those skilled in the art will recognize, that the planar micro-motor of the invention can be adapted for use in certain preferred embodiments as a stepper motor. It will also be recognized by those skilled in the art that the micro-motor of the present invention, comprising co-planar rotor and stator, is a significant advance in the art. It differs from the traditional motor arrangement of planar rotor surrounded by a coplanar stator, wherein a magnetic field is applied across the radial (cylindrical) gap between the stator and the ends of the rotor.

Figure 1:
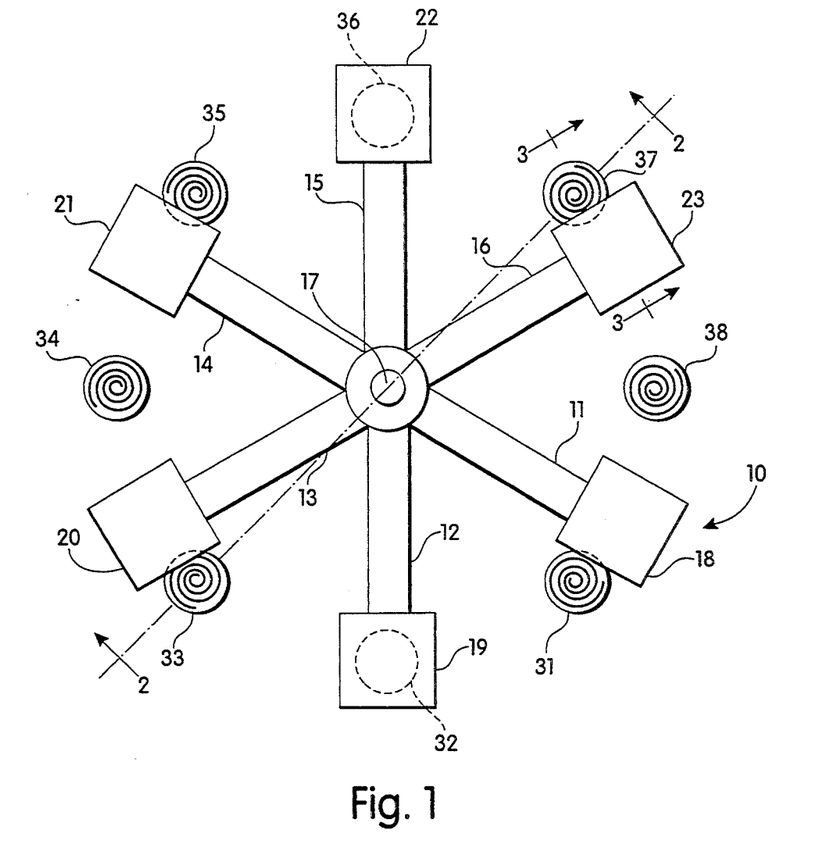
FIG. 1 is a schematic plan view of a planar micro-motor in accordance with a preferred embodiment of the invention.
Figure 2:
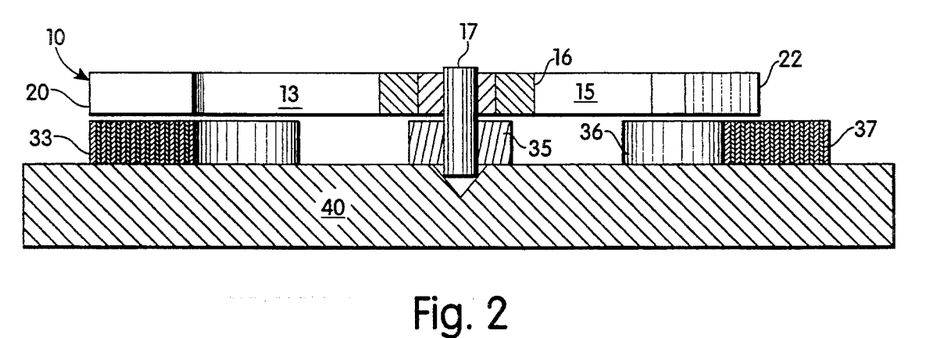
FIG. 2 is a schematic section view of the planar micro-motor of FIG. 1, taken through line 2—2.

FIGS. 1 and 2 are top and side views, respectively, of a planar micro-motor according to one embodiment of the invention, schematically illustrating the relationship between a rotor having six magnetic regions and eight circumferentially spaced micro-coils. The rotor comprises a six-legged rotor body. More specifically, the rotor 10 comprises six legs 11–16, each extending radially outwardly from rotor axle 17 to a distal end terminating with a ferromagnetic segment 18–23, respectively. Of course, the rotor body could have other configurations, for example, a disc, one or more sections of a disc, a thin polygon etc., with circumferentially spaced magnetic regions or segments embedded in or otherwise carried by the rotor body, typically at or near its outer perimeter. Each of the micro-coils 31–38 is seen to comprise a single spiral of electrically conductive material supported by a substrate 40. Numerous other designs for the micro-coils and rotor, including alternative spacing, number and configuration for both, will be apparent to those skilled in the art in view of the present disclosure.

Primary factors typically affecting the choice of the number of legs in a legged rotor body design, the number and spacing of magnetic regions etc. include, for example: (1) the scale of the lateral gradient of the magnetic energy density in the rotor plane compared with the lateral width of each magnetic region; (2) the balancing of forces to reduce wear on the axle bearing(s); (3) the total axial load on the bearing(s); (4) the moment of inertia of the rotor; and (5) the magnitude of force to be applied to the rotor in a given angular position. In certain embodiments the perimeter of the rotor preferably contains a continuous ring of spaced (modulated phase) ferromagnetic elements. Other alternative and optional features and design configurations, and factors affecting their selection, will be apparent to those skilled in the art in view of the present disclosure.

The planar micro-coils are positioned preferably on the circumference of a circle whose center is coaxial with the axle of the rotor. The circle formed by the micro-coils preferably in substantially aligned with the circle formed by the magnetic regions of the rotor. Choosing the number and configuration of micro-coils used will depend, in part, on the particular application intended for the planar micro-motor, and will be within the ability of those skilled in the art in view of the present disclosure. Primary factors typically affecting the number, size, number of turns, radial position and configuration of the micro-coils include, for example: (1) the desired torque to be generated during operation of the micro-motor; (2) the desired smoothness of rotary motion; and (3) the desired angular resolution of the applied forces.

In the embodiment of FIGS. 1 and 2, the rotor has two-fold symmetry about its axis of rotation. This preferred design tends to balance torques that could otherwise tilt the rotor axle and contribute to additional axle loads.

Figure 3:
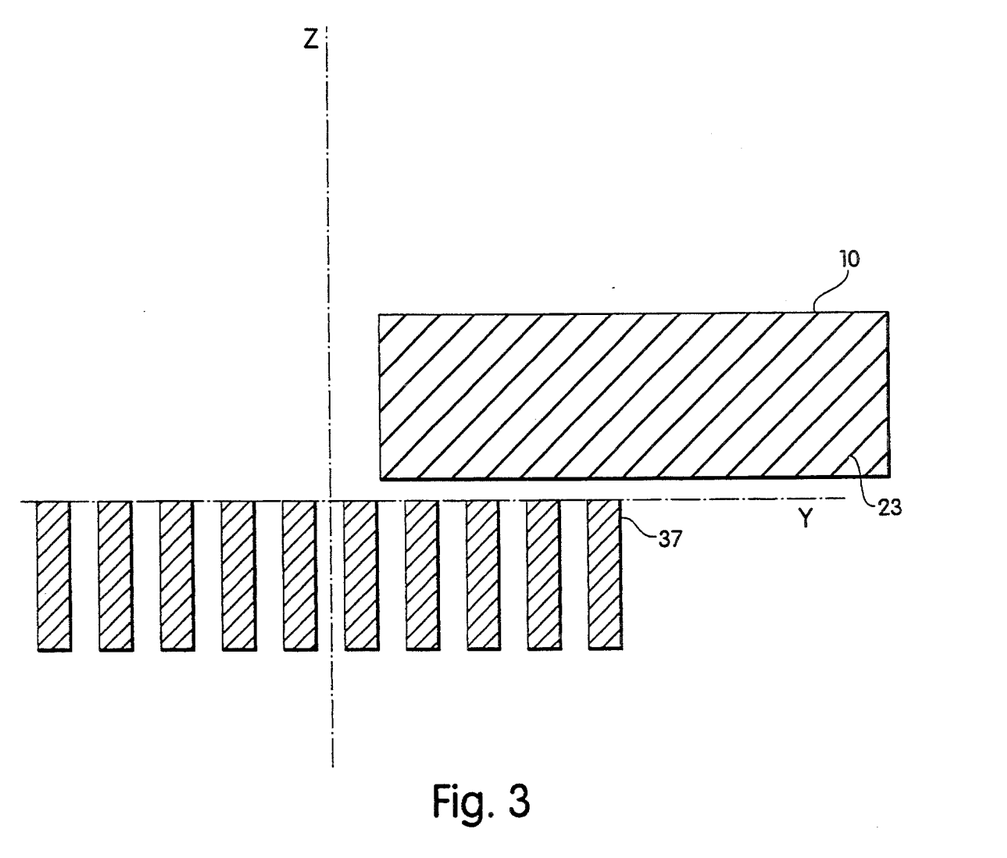
FIG. 3 is an enlarged schematic section view of the planar micro-motor of FIGS. 1 and 2 taken through line 3—3 in FIG. 1.

In FIG. 3 the end of ferromagnetic segment 23 is shown above planar micro-coil 37. The vertical axis "Z" is the axis of substantial symmetry of the coil. The coil is a single layer of windings having uniform rectangular cross sections. Current in the coil passing in the negative x-direction for windings in the (+) y-z plane (4th quadrant) emerge in the opposite direction in the (−) y-z plane (3rd quadrant). The rotor is very close to the planar micro-coil and, when the coil is energized, the rotor experiences rotational force with both horizontal and vertical components. The horizontal force causes a torque about the axle, giving rise to rotation of the rotor. The relative magnitudes of the vertical and horizontal forces typically will depend upon factors discussed above and will be readily apparent to those skilled in the art in view of the present disclosure, including especially the position of the ferromagnetic element of the rotor with respect to the center of the coil. The source of the motive force to move the rotor is the pressure on the surfaces of the magnetic region(s) of the rotor created by the magnetic field intensity at the rotor surface and difference in magnetic permeability on either side of the surface. Field gradients across vertical surfaces will give rise to horizontal forces, while gradients across horizontal surfaces will give rise to vertical forces. While not wishing to be bound by theory, this pressure can be represented by the equation:

$$P = \tfrac{1}{2}(\mu_1 - \mu_2)H^2$$

where P is the pressure, H is the magnetic intensity and $\mu_1$ and $\mu_2$ are the magnetic permeabilities. In the case of a permanent magnet of magnetization M, the pressure on a pole face (uncorrected for field leakage) is given by the product H.M.

Certain preferred embodiments of the invention comprise means for applying lift forces to the rotor during rotation, thereby reducing starting and rotational friction. An exemplary such means comprises a planar micro-coil concentric with the rotor shaft to generate such lifting force on the rotor.

Figure 4A:
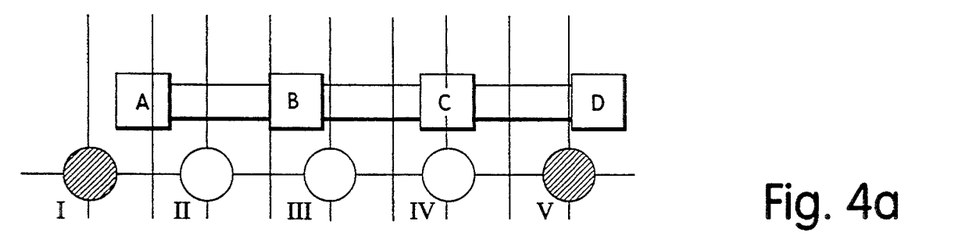
FIGS. 4a–4e are schematic illustrations of sequential phase relationships between rotor segments and energized coils during operation of the planar micro-motor of FIGS. 1-3.
Figure 4B:
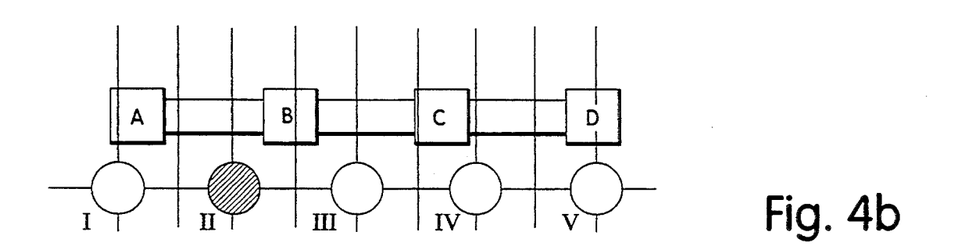
Figure 4C:
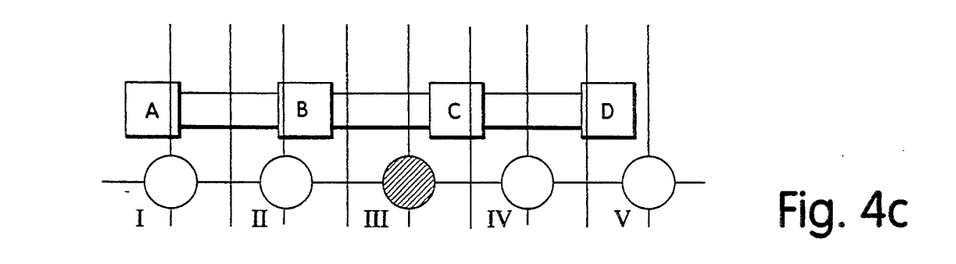
Figure 4D:
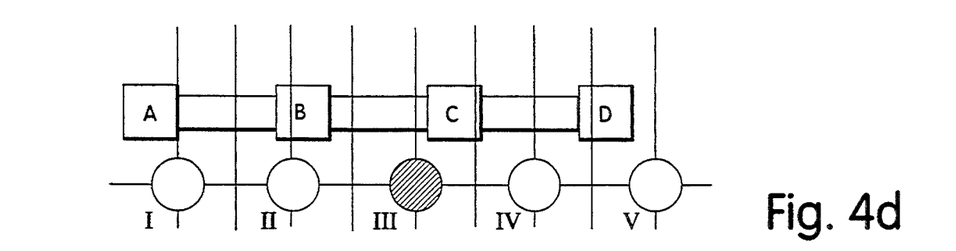
Figure 4E:
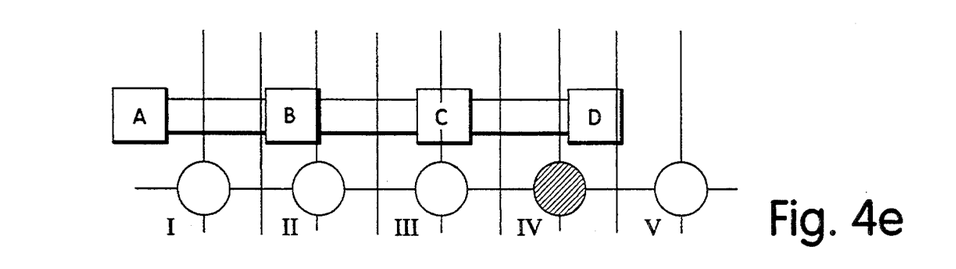

Phase relationships between rotor sectors and coil positions for the rotating rotor are illustrated in FIGS. 4a–4e. Four ferromagnetic regions of a rotor body, labeled A–D, are shown in five sequential rotor positions above five equally spaced micro-coils, coils I–V. Only five coils need be examined to treat the eight-coil design of FIGS. 1 and 2, due to the periodicity of the coil-rotor design. In one preferred mode of operation, the coils are energized from the time a rotor section first becomes proximate to the coil, even before overlap is established, to the time the rotor section is at or near the mid-point of the coil. In the illustration of FIGS. 4a–4e, the first and last coil are energized and de-energized simultaneously while the other coils have different phase relationships, according to their relative spacial positions. The energized coils are shown in solid black, while the non-energized coils are shown as open circles. Thus, in FIG. 4a coils I and V are energized, since rotor sections A and D, respectively, are approaching the mid-point of those coils. At the next point in time illustrated in FIG. 4b, coils I and V are no longer energized; coil II is energized, since rotor section B has at that point in time become proximate to it. Shortly thereafter, FIG. 4c shows coil III to be energized as rotor section C approaches it. The other coils are not energized. In FIG. 4d coil III is the only coil energized as rotor section C approaches its mid-point. Finally, in FIG. 4e, coil IV is energized as rotor section D approaches it. Of course, a micro-coil (not shown) to the left of coil I would also be energized as rotor section A approaches it. Thus, subsets of the micro-coils are sequentially energized to rotate the rotor in controlled fashion.

In accordance with certain preferred embodiments, the instantaneous position of the rotor can be determined, either by position sensors included in the planar micro-motor, or by using the micro-coils and the rotor as position sensors. Between periods of energizing individual micro-coils, they can be logically switched to a capacitive sensing circuit according to means well known to those skilled in the art, to measure for example the capacitance between a coil (or pair of coils) and the rotor. For this purpose, the rotor body can have a thin nonmagnetic metal coating or the like over surface area facing the plane of the coils. By measuring capacitance differentially between two coils and the rotor, the rotor need not be electrically connected to a reference potential, but can be a floating electrode (having a weak path to ground potential through the natural resistance of the motor components). According to alternative preferred embodiments wherein separate position sensors are used, auxiliary capacitor electrodes can be fabricated, for example, in the plane of the micro-coils or in the plane above the rotor in order to have independent and continuous rotor position sensing.

Auxiliary sensors can be provided in accordance with the teaching of a linear rotary differential capacitance transducer (LRDCT) in an article of that name by Randall D. Peters, Rev. Sci. Instrum. 60(8), pp. 2789–2793, Aug. 1989, and U.S. Pat. No. 5,028,875 to Peters, both of which are incorporated herein by reference. Another suitable position sensing technique comprises monitoring differentially the back emf on pairs of nonenergized coils. Back emf monitoring is known to those skilled in the art and given this disclosure will be readily implemented in the planar micro-motor of the present invention.

Certain preferred embodiments comprise feedback control means with position sensors, such that the rotor position can be changed with arbitrarily small increments of angle, limited by the resolution of the position sensors and their associated control circuitry. Suitable control circuitry is well within the ability of those skilled in the art, given the present disclosure, as is its incorporation into a silicon substrate unitary with that employed in the fabrication of the micro-motor itself.

As indicated above, the planar micro-motor of the present invention can be adapted in accordance with certain preferred embodiments for operation as a stepper motor. Control circuitry can be provided, optionally as integrated microcircuitry on a silicon substrate unitary with that employed to support the micro-coils of the micro-motor, as further discussed below, to sequentially energize the coils to accelerate the rotor from one stationary position to the next. Typically, the control circuitry is responsive to an externally generated signal. The rotor can thus be moved from one coil position to the next coil position, decelerated and stopped, and so on to each sequential coil position, with reversal of direction as desired. The movement of the rotor can be as small as the distance moved in response to one power pulse to the coils. In preferred embodiments comprising position sensors, the minimum step typically equals the minimum angular resolution of the sensors. This can be achieved with a correspondingly short power pulse. Of course, at the opposite extreme, the maximum movement of the rotor can be as many complete circular rotations as desired.

Those skilled in the art will readily recognize from the present disclosure that micro-motors comprising linear sliders are within the scope of the present invention, their fabrication and operation being in accordance with the principals outlined above. In particular, it will be apparent that the application of force to a magnetic element confined to planar motion above a planar array of micro-coils can be controlled by suitable circuitry to generate unidirectional linear motion or reciprocating linear motion.

In accordance with certain highly preferred embodiments, the planar micro-motor is designed for fabrication and assembly by novel application of well known microfabrication technologies including, for example, silicon micromachining, integrated circuit fabrication technologies (such as bipolar, CMOS, BIMOS) and the above discussed LIGA-type and MPP-MEMS-type technologies. Materials suitable for use in LIGA-type techniques, in particularly, are those that can be deposited as films onto and into (meaning conformal deposition) prepatterned films or molded using miniature dies fabricated with LIGA processes. These materials include electroplated metals, alloys, injection molded plastics, and slip-cast ceramics. The prepatterned films typically comprise photosensitive PMMA, with exposure being performed usually in a vacuum chamber on a beam line attached tangentially to an electron storage ring of a synchrotron. A conventional undulator also may be required to achieve adequately short x-ray wavelengths. A typical LIGA process includes the following steps:

1. Prepare x-ray mask of patterned gold on a thin membrane;
2. Cast polymethyl-methacrylate (PMMA) resist layer on a substrate;
3. Align mask to substrate and expose with synchrotron x-rays;
4. Remove exposed PMMA to reveal patterned structure;
5. Electroplate metal (e.g., nickel) in patterned PMMA; and
6. Remove PMMA to produce final "direct-LIGA" device.

The process can be terminated here with the production of direct-LIGA devices. To make more such devices, one can repeat the process beginning at step (2). To avoid additional synchrotron exposures, which can be expensive and time consuming, a replication process can be used, wherein the first direct-LIGA device is a mold for replication by injection molding or slip-cast molding:

7. Injection mold plastic in direct-LIGA mold;
8. Release plastic replica from mold (final product A);
9. Electroplate desired metal in the plastic replica; and
10. Release electroplated device (final product B).

In the replication process there are two points where a final product can be extracted (A and B above).

Figure 5:
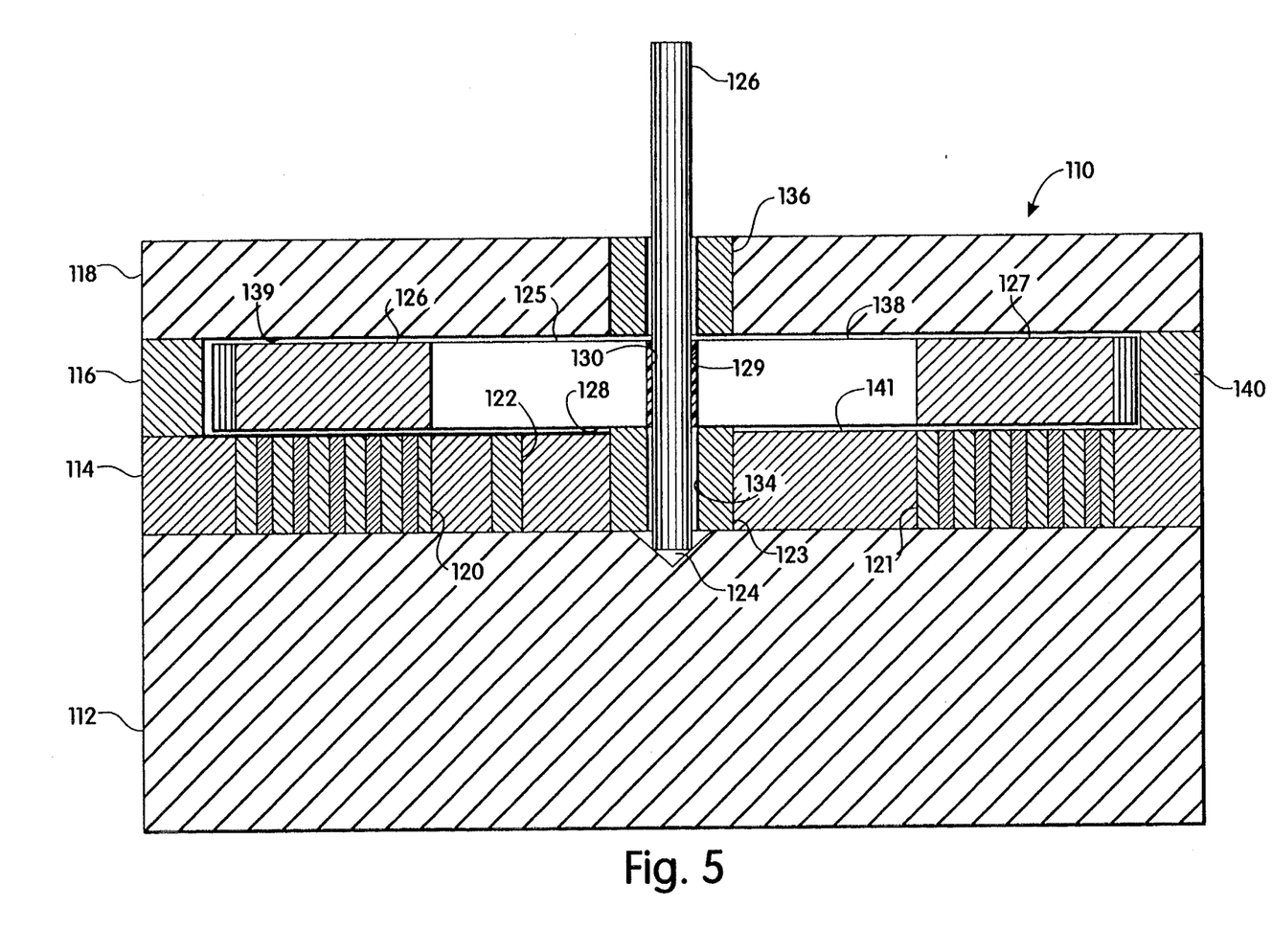
FIG. 5 is a schematic cross-section view of a micro-motor in accordance with another preferred embodiment of the invention.

An assembled micro-motor in accordance with a preferred embodiment of the invention, suitable for fabrication by LIGA-type and/or MPP-MEMS-type, etc. processes is illustrated in FIG. 5. Specifically, assembled micro-motor 110, shown in cross-sectional view in FIG. 5, consists of four layers: a substrate layer 112, a coil layer 114, a rotor layer 116, and a cap layer 118. Specifically, the substrate layer 112 forms the main foundation for the assembly and can be made of various known materials, provided the interface between the substrate layer 112 and the coil layer 114 is insulating in the region of the micro-coils to avoid short circuiting the windings of the micro-coils. Silicon is the most preferred material for the substrate layer, since silicon micromachining is well known and can be used to fabricate, with precise dimensional precision, a bearing well and possibly other configuration features. In addition, silicon provides a relatively hard surface that provides advantageous resistance to wear and good load bearing performance. Also, as indicated above, associated logic and control circuitry can be fabricated on the surface of the silicon substrate and connected to the micro-coils by advantageously short leads. Of course, those skilled in the art will recognize that such circuitry, rather than being integrated on the silicon substrate, may instead be pre-fabricated and mounted to or together with the micro-motor. The necessary micro-coil connections can in that case be made, for example, by metal traces on the silicon substrate connecting to the micro-coils through vertical vias.

The coil layer 114 comprises the planar array of micro-coils, two such coils 120 and 121 being shown in the cross-sectional view of FIG. 5. In the embodiment of FIG. 5, the micro-coils are formed of metal, for example, copper. Coil layer 114 further comprises optional auxiliary position sensor electrodes, including electrode 122. Electrode 122 preferably is formed of aluminum and is in electrical contact via a lead on the surface of substrate 112 to remote circuitry. Coil layer 114 further comprises rotor axle bearing 123. Rotor shaft well 124 is formed in substrate layer 112 concentric with shaft receiving hold 134 extending axially through bearing 123 at the center of coil layer 114. The region between the axle bearing and the micro-coils, and the space between the coil windings, may be empty or filled with an insulating material. In view of the thickness typically called for in the coil layer 114, it is fabricated preferably using the aforesaid LIGA technologies, which permit the axle bearing, auxiliary electrodes and the micro-coils to be fabricated substantially simultaneously. The casting material for the micro-coils, bearing(s), etc., typically polymethylmethacrylate (PMMA), can be left in place for structural support, further simplifying the fabrication. Typically, the coil layer is a one piece structure micromilled (e.g., diamond turning) to a specified flatness in accordance with techniques well known to those skilled in the art.

The rotor layer 116 comprises rotor body 125 made of non-magnetic material with localized regions of magnetic material. Specifically, rotor body 125 comprises multiple separate ferromagnetic regions, of which ferromagnetic regions 126 and 127 are seen in FIG. 5. Well known fabrication technologies including the aforesaid LIGA-like technologies, which is preferred, can be employed in the fabrication of either an entirely metallic rotor body or a non-metallic rotor body with patterned metallic regions. The rotor body, typically will be micromilled to achieve a desired thickness and flatness in accordance with well known microfabrication techniques.

It can be seen that a gap 128 exists between the coil layer 114 and the rotor body layer 116. Bearings 123 extend above the main surface of coil layer 114 to support the rotor body 125. Typically, the rotor body will be cemented or otherwise integrated with rotor shaft 126. In the embodiment illustrated in FIG. 5, cement 129 is employed in the rotor shaft hole 130 provided at the center of rotor body 125 to attach the rotor body to the shaft.

The cap layer 118 is fabricated preferably of transparent plastic, for example PMMA. Here, again, the aforesaid LIGA technology is applicable and enables fabrication of the layer from transparent plastic with integrated shaft bearing 136. Shaft bearing 136, along with shaft bearing 123 in coil layer 114, may be formed of metal, ceramic or plastic having adequate durability and other performance characteristics. Those skilled in the art will recognize that shaft bearing 136 optionally may extend downwardly to bear against upper surface 138 of rotor body 125 to fix the axial position of rotor 125 between coil layer 114 and cap layer 118. A transparent cap may be advantageous during testing of the micro-motor and/or during operation of the micro-motor in certain applications, for example in speed measurements during continuous operation. Such applications include, for example, those wherein the rotor body itself carries markings intended to be a visible position indicator during operation. Cap layer 118, at least its lower surface 139, typically will be micromilled in accordance with known techniques to achieve desired thickness and flatness. As discussed, the cap layer also may comprise auxiliary components, such as electrodes adapted for sensing the position of the rotor or other functions.

Rotor layer 116 of micro-motor 110 further comprises rotor spacer 140 to separate the upper surface 141 of coil layer 114 from lower surface 139 of cap layer 118 so that the rotor has the desired clearance for rotational motion. While the rotor spacer 140 in the preferred embodiment of FIG. 5 comprises a single layer, spacers comprising two or more layers can be used and are particularly applicable, for example, in embodiments wherein the coil layer filler material is not left in place. The rotor spacer is readily fabricated using microfabrication techniques, such as the aforesaid LIGA-like techniques, from any plastic, metal, ceramic, etc. having adequate structural strength for its intended purpose. Micromilling may be used to produce the desired degree of precision in the spacer dimensions and surface flatness. Optionally, the thickness of the spacer permits fabrication of auxiliary electrodes therein. Thus, for example, the rotor spacer could comprises auxiliary electrodes forming vertical capacitor plates adapted for use as position sensors or the like.

The rotor axle 126 is readily fabricated to desired dimensions, including length and diameter, in accordance with well known methods and materials. The shafts can be made, for example, of thin wires cut to length. The shaft can be mounted to the rotor body by various alternative means, including a curable cement applied in liquid form when the shaft is assembled to the rotor body.

As discussed above, control circuitry can be provided for operation of the micro-motor, for example, in response to input signals from sensors or other remote signal generating means. Integrated control circuitry including, for example, coil drivers, timing means, and logic circuitry, preferably is fabricated on the surface of the substrate layer 112. Such integrated circuitry can be fabricated under and/or to the side of the micro-coils. Alternatively (or in addition) circuit chips can be mounted near the micro-motor substrate and "bumped" or wire bonded to bonding pads on the substrate. Energizing means for selectively passing electrical current to the micro-coils to general electromotive force to rotate the rotor preferably comprises bonding pads for connecting such control circuitry to the micro-coils. Bonding pads and interconnect traces can be applied as a first layer of metalization on the substrate during fabrication of the micro-motor. Vias are then formed in a subsequent, overlying layer.

An electroplating form for the micro-coils and lower shaft bearing 123 can be fabricated using microfabrication techniques, such as the LIGA technology, and then clamped in place on the silicon substrate with the micro-coil ends in registry over their respective bonding pads. Upon electroplating through the form or template, the micro-coils and bearing 123 are fabricated simultaneously, with the coils automatically bonded through the vias to their proper metal leads or bonding pads. This approach also provides structural bonding of the coil layer to the substrate. Typically, the substrate is larger than the remaining structure of the micro-motor, providing areas where outside connections can be made to integrated circuitry. Openings in the micro-motor's upper structure can provide access to underlying integrated circuitry. In final assembly of the micro-motor, layers of the structure not automatically joined (such as those embodiments wherein the coil layer is automatically bonded to the substrate layer by an electroplating step or the like, as described above) may be joined by any suitable means. Layers may be cemented together, thermally or solvent bonded by fusing common plastic interfaces, externally clamped, or bolted using through holes, as well as by any combination of these techniques.

Figure 6:
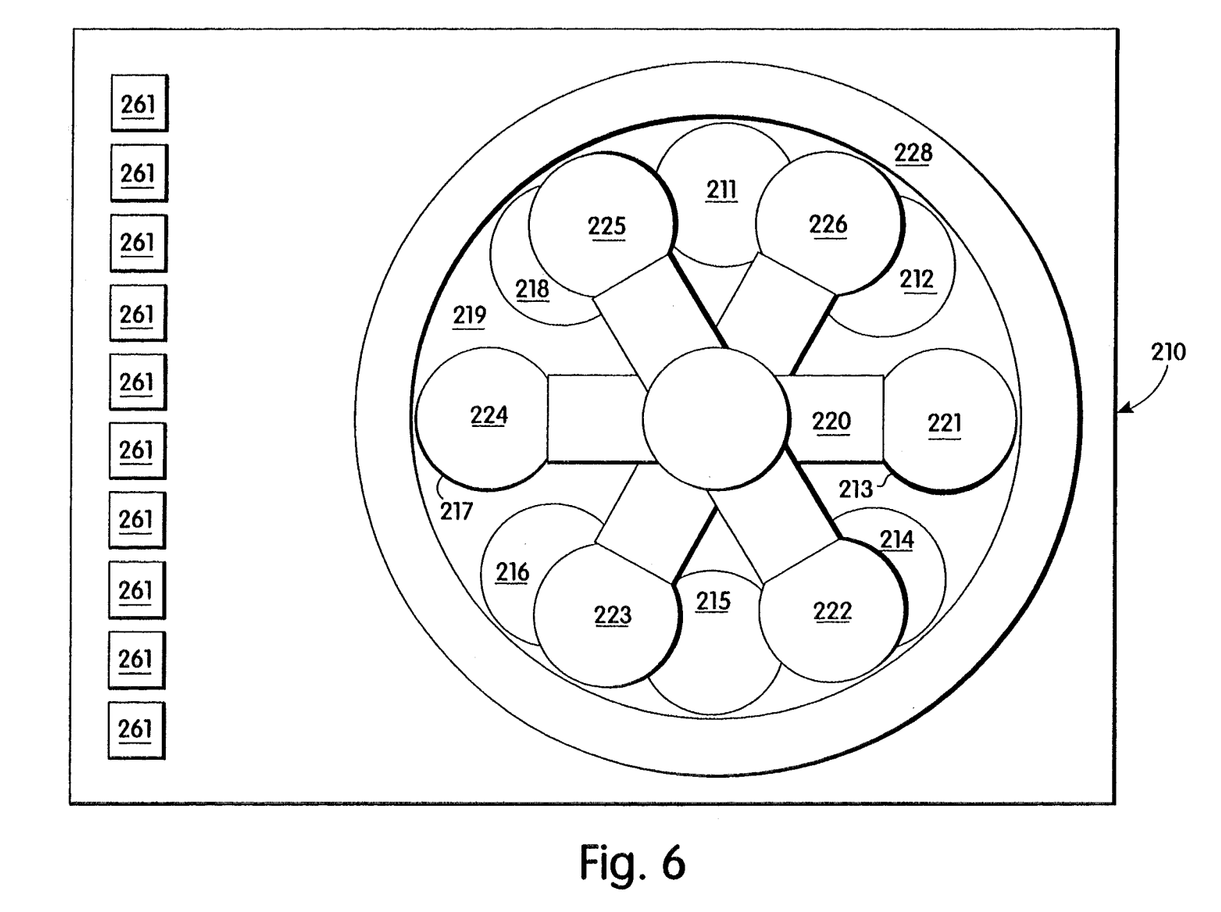
FIG. 6 is a schematic plan view of the major components of a micro-motor in accordance with another preferred embodiment of the invention.
Figure 7:
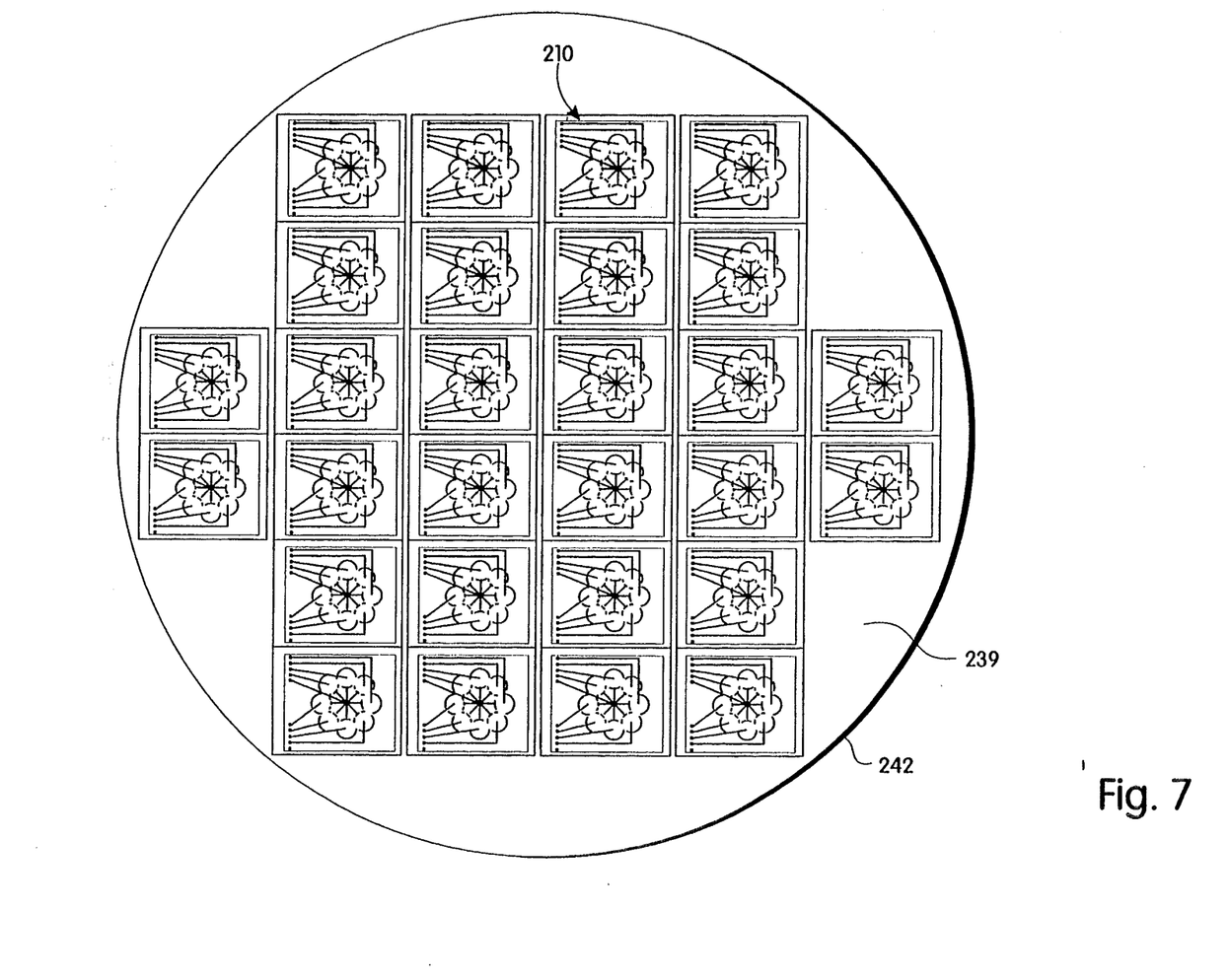
FIG. 7 is a schematic plan view of a silicon wafer being processed in accordance with the method of the invention for batch fabrication of multiple micro-motors in accordance with the embodiment of FIG. 6.
Figure 8:
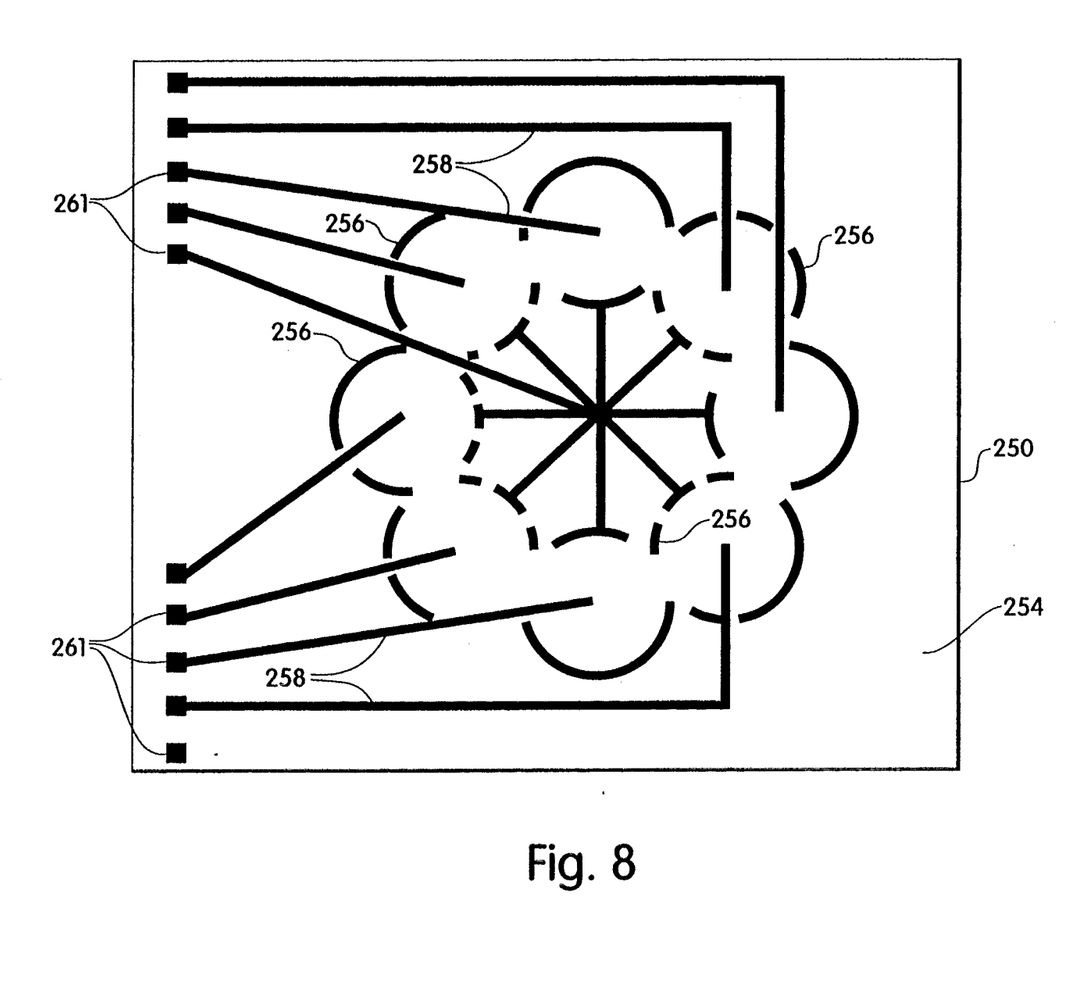
FIG. 8 is an enlarged schematic view of one such micro-motor, showing an exemplary layout for power lead traces between bonding pads and micro-coils of the micro-motor.

As now described, photolithography is used in the assembly of micro-motor 110 to achieve miniaturization and multiple devices from a single plate of substrate material, with multiple layers being brought together to form the final structure. The aforesaid known LIGA technologies are particularly applicable to this fabrication. The fabrication of multiple identical planar micro-motors in accordance with one preferred embodiment of the invention is described below with reference to FIGS. 6–15. The planar micro-motor 210 has the following specification (all dimensions approximate):

A) eight micro-coils 211–218 in coil layer 219, spaced circumferentially on a 4,000 micron radius circle (the radius being measured to the radially innermost point of the coil); each micro-coil being a one hundred turn spiral of 5 micron-thick windings separated from each other by 5 microns, 100 microns high by 2,000 microns in diameter;

B) coil layer 219 fabricated using LIGA microfabrication techniques initial thickness of 100 microns; micromilled both sides to 80 microns final coil thickness;

c) six-pole plastic rotor body 220 with six electroplated ferromagnetic regions 221–226 100 microns initial thickness micromilled to 80 microns final thickness;

D) plastic rotor spacer 228; 110 microns initial thickness micromilled, both sides, to 100 microns final thickness;

E) plastic cap layer 282 with metallic axle bearing 286; initial thickness 100 microns micromilled on one side for flatness;

F) substrate layer 250 cut from silicon wafer 242 (300 microns to 500 microns thick); micromachined to produce a bearing well 262 to receive rotor shaft; carrying ten 200 by 200 micron bonding pads 261 and various metal traces 237 on its upper surface 239 to interface with micro-coils 211–218; and 'G) dedicated electronics 240 either on-chip bi-polar integrated circuitry or a hybrid configuration comprising prefabricated chip(s) on a neighboring substrate, the integrated circuitry comprising an oscillator for basic timing, frequency divider to divide timer frequency to obtain micro-coil driver frequency, current drivers for energizing the micro-coils, logic circuitry for programmed control of micro-coil driving algorithm, and differential capacitance position-sensing circuitry using the micro-coils as capacitance electrodes.

The substrate layer for the planar micro-motor is batch fabricated from a single-crystal silicon wafer using typical silicon wafer processing procedures. Numerous micro-motors can be batch fabricated from a single four-inch silicon wafer. Batch fabrication of dozens of wafers per lot by a single operator can reduce labor costs. Furthermore, this type of miniaturization, using thin film processes typical of the electronics industry, enables various degrees of integration of electrical lines. This supports improved reliability. With LIGA-type and MPP-MEMS-type of microfabrication, one adds further a larger scope of materials as well as thicker mechanical parts which support higher forces and torques.

The substrate layer is provided with peripheral bonding pads, metal traces and a bearing well to receive the lower end of the rotor axle. Nine bonding pads are used to power the eight coils from individual leads, with power being returned on a common line. Two additional bonding pads plus a ground connection would support a differential position sensor. In accordance with typical fabrication procedures, the silicon substrate is cleaned and an insulating oxide film applied. A metal strike is applied, for example, as a sputtered bond-film of chromium or titanium followed by a low resistant film of copper or nickel. In certain embodiments, it is generally preferable to first form the metalization of the bonding pads, interconnect and busses. A second metallization forms the electrically conductive vias. The coils are then formed in a third metallization. Those skilled in the art, however, in view of the disclosure, will readily understand alternative fabrication sequences which may be preferable or at least suitable in certain applications. Next, an etch mask layer is applied such as, for example, silicon nitride, silicon oxide, or a combination thereof. A layer of photoresist is then applied and patterned for the rotor axle end bearing. It will be recognized that the pattern is repeated for each of the multiple micro-motors being formed on the silicon wafer. Thus, while only a single axle bearing may be required for an individual micro-motor, the photoresist pattern will provide for multiple such bearings over the surface of the silicon wafer. The photoresist is processed to define vias at the locations of the axle bearings. The term "via" and its plural "vias" are used here to mean holes passing through a layer. In some cases the hole is filled with metal to form a connector to provide an electrical path between layers. In the case of the vias referred to immediately above, the hole may merely expose the underlying layer to etching solution, etc. The etch mask is then patterned (i.e., the etching vias for the rotor axle end bearings are opened) and the exposed silicon substrate is micromachined through the etch mask to form the bearing wells, preferably using potassium hydroxide to etch the silicon anisotropically. The depth of the anisotropically etched bearing well is automatically determined by the width of the mask opening. Thus, in a [100] silicon wafer, limiting [111] etch surfaces are formed, effectively stopping the etching process.

In subsequent steps, the bearing well surface is covered with photoresist until the coil layer is formed.

Thus, the substrate is again covered with photoresist and patterning is done for bond pads and metal traces for power leads to the coils in the coil layer (and any traces needed to connect auxiliary electrodes) as well as additional coil supports, as space permits. Patterning is done preferably by photolithography in a thick photoresist. The patterned photoresist is then processed, followed by electroplating through the patterned photoresist.

Referring specifically to FIGS. 8–15, an exemplary micro-fabrication process suitable for producing the above described micro-motor includes providing a silicon substrate 250 carrying on its upper surface metal strike 252 and patterned photoresist 254. The patterned photoresist defines a receiving area 255 for base supports 256 (as space allows) for the micro-coils of the micro-motor, openings 257 for metal traces 258 and openings 260 for bonding pads 261. The micro-motor most preferably is a three-phase motor. As such, a minimum of three input power lines busses and one return (ground) line is required. Each coil is returned to a common ground bus which has an interconnect to a ground-pad, the interconnect preferably being just a continuation of the bus. The use of ten bonding pads in the embodiment shown simplifies the drawing by avoiding the need to illustrate complex routing of leads. It will be apparent that subsets of the bonding pads will have the same potential requirements and will be connected in common external to the device substrate. This is especially desirable in high current applications to enable distribution of power in smaller, multiple wires or leads. The bonding pads may, for example, be 200 microns by 200 microns square. Coils having, for example, rectangular cross-section windings of 5 microns wide by 100 microns high typically require metal traces of comparable cross-sectional area. Thus, the electroplated traces in the illustrated embodiment are 5 microns thick.

Figures 9, 10:
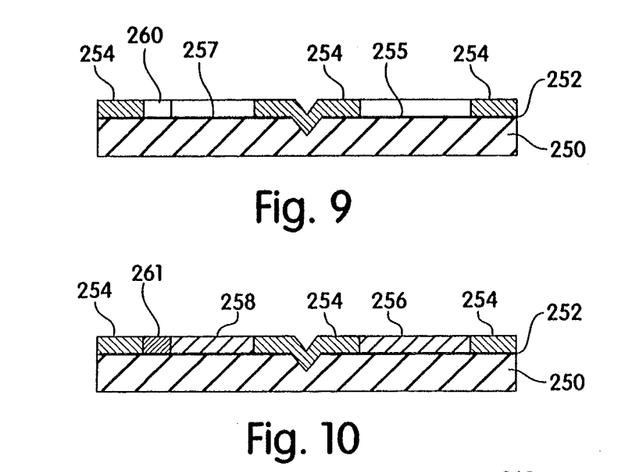
FIGS. 9-15 are schematic cross-section views of successive stages in the fabrication of the micro-motor of FIGS. 6-8.
Figure 11:
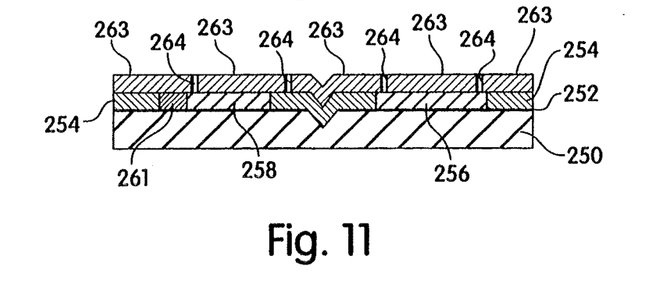

Although the first photoresist layer may be removed and a standard planarization layer added, preferably a second photoresist layer is spun onto the partially processed substrate to coat the mid-fabrication product illustrated in FIG. 10. The photoresist layer is patterned for inner and outer coil connections, and the patterned photoresist is processed to open vias at these locations. This procedure involving the use of a double photoresist layer is a novel and advantageous aspect of the present invention. FIG. 11 illustrates the midfabrication assembly carrying the second patterned photoresist 263 through which vias 264 have been opened as mentioned immediately above.

Figure 12:
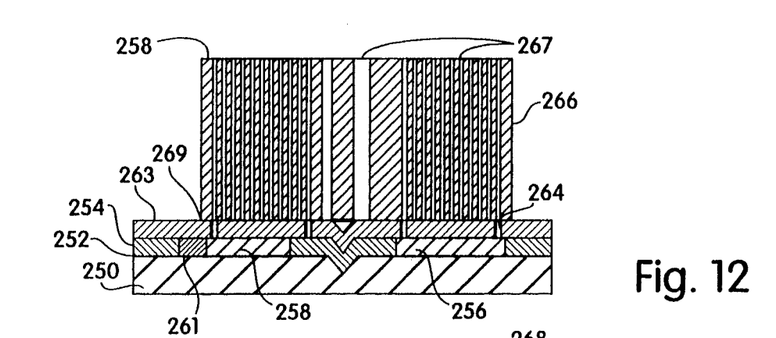
Figure 13:
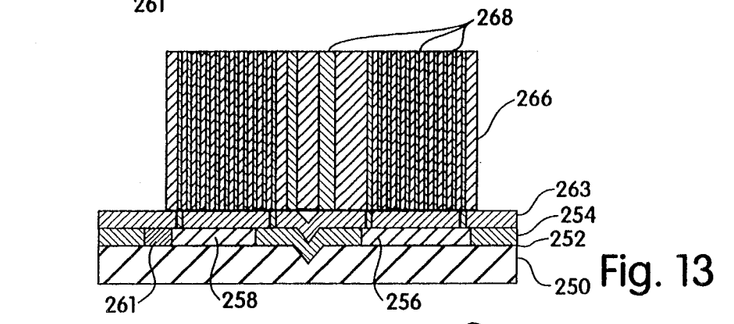
Figure 14:
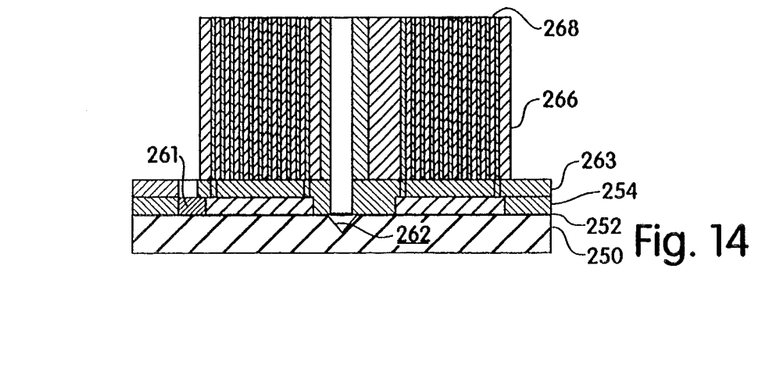

The coil layer of the micro-motor is fabricated in place upon the prepared, double photoresist layer on the substrate. Preferably, as illustrated in FIG. 12, a LIGA-fabricated form or mold is prepared to form the coils, rotor axle bearing (i.e., axle side bearing, not the end bearing which has already been formed). Any auxiliary electrodes are also electroplated in place through the LIGA-fabricated form. The coil-form may be fixed, e.g. clamped, to the substrate, but preferably is a permanently integral part of the structure being formed. The mold has patterned openings 267 that pass from the top 268 to the bottom 269 of the mold 266. The mold is clamped in place on the prepared substrate with the coil openings 267 etc. in registration with the patterned metal traces 258 such that the inner and outer trace termini are just below the ends of the coil openings. In a typical embodiment, the coil layer may be 100 microns high with 5 micron wide coil openings separated by 5 microns of mold material, typically PMMA. The two photoresist layers on the substrate provide a compliant interface to the coil layer mold, so that an adequate seal is provided under clamping pressure to prevent electroplating electrolyte from short circuiting neighboring windings of the coils. Once coils 268 have been electroplated, as seen in FIG. 13, a single unit two-layer structure is formed. In the coil layer, the core of the rotor axle bearing, which is still filled with mold material, must be cleared. In one preferred embodiment, the resist layer comprises photosensitive polyimide, rather than PMMA, so as to be dissolvable following further exposure to ultraviolet light. The polyimide is exposed through a shadow mask, thus rendering it selectively dissolvable. It is then removed in accordance with well known development procedures. The bonding pads 261 and bearing well 262 are exposed by removing the single and double photoresist layers, respectively, covering these areas. The resulting mid-fabrication assembly is illustrated in FIG. 14.

Any photoresist lost from the region separating the coil and the substrate layers can generally be tolerated, since the coils have a solid foundation, having been plated onto five micron metal trace termini and other coil supports on the substrate. The mold material between the coil windings can be left in place to add strength to the coil layer. Similarly, photoresist is left in place underneath the coils to the extent possible.

Figure 15:
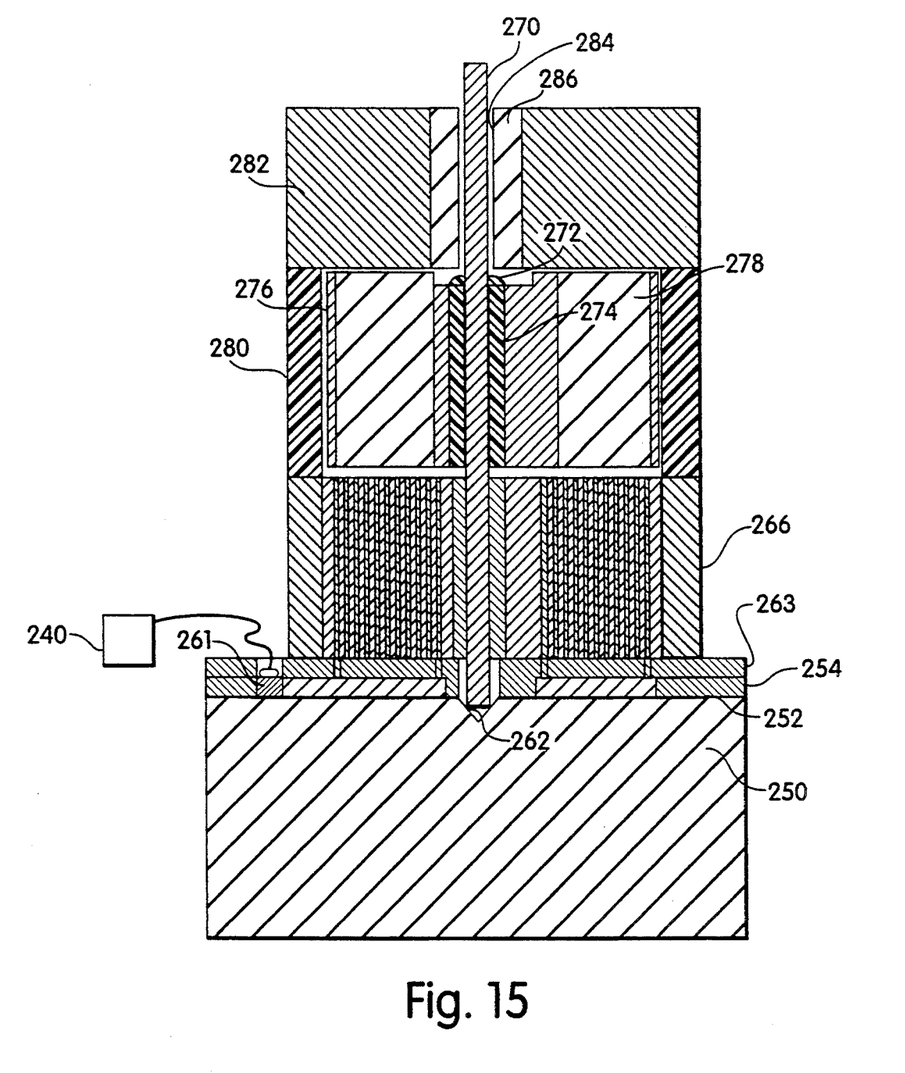

The rotor for the planar micro-motor is fabricated preferably also using LIGA-type mold forms. Thus, PMMA or the like can be injection molded to form the main parts of a rotor structure with openings included in the PMMA structure for electroplating ferromagnetic material in desired locations. Alternatively, the rotor can be formed using patterned photosensitive polyimide, with subsequent electroplating to produce the metallic structures. A rotor axle bearing preferably is electroplated at the center of the rotor, after which PMMA material in the core of the axle bearing is removed, as previously described. The rotor axle can be fashioned of thin wire cut to length and mounted with a small drop of cement. Alternative shaft materials and mounting means will be readily apparent to those skilled in the art in view of the present disclosure. In FIG. 15, rotor axle 270 is seen to be bonded by cement 272 within axle bearing 274 at the center of rotor 276. Ferromagnetic regions 278 in the rotor are seen to be substantially radially centered over the coils.

As illustrated in FIG. 15, the micro-motor further comprises a plastic spacer 280, which can be formed by injection molding in a LIGA-type form or by patterning with photosensitive polyimide. Alternatively, the spacer could be made, for example, of metal by electroplating in a LIGA-type form. Cap 282 can be batch fabricated by injection molding plastic, preferably transparent plastic, into LIGA-type molds. As illustrated in FIG. 15, cap 282 has a central opening 284 defined by axle bearing 286 formed preferably of metal by electroplating followed by removal of the bearing core in accordance with techniques described above. The bottom surface of the cap preferably is micromilled and then released from its mold form for assembly. Although numerous alternative assembly methods will be readily apparent to those skilled in the art in view of the present disclosure, one preferred method comprises locating the cap, top down in a jig. The spacer is then put into a shoulder in the jig which coaxially centers the spacer. The axial dimension of the spacer is greater than that of the rotor and aids in centering the rotor which is positioned next. The rotor axle, preassembled to the rotor, is inserted into the axle bearing of the cap. Finally, the combined coil layer and silicon substrate assembly, as described above, is positioned in the jig. Such final assembly can be cemented and/or clamped together. Cementing can be accomplished, for example, by solvent welding or thermally fusing common plastic interfaces.

Those skilled in the art will recognize various modifications which can be made to the preferred embodiments of the product and method described above. All such modifications within the true scope and spirit of the invention are intended to be included within the scope of the claims recited below.

I claim:

1. A planar micro-motor comprising:
   a substrate;
   a stator supported by the substrate comprising electromotive force means for receiving electrical current to selectively generate electromagnetic fields in multiple electrical phases, comprising a plurality of micro-coils arrayed in a first plane, with each micro-coil in a different electrical phase than an adjacent micro-coil in said first plane; and
   a rotor having a planar rotor body aligned over the electromotive force means in a second plane parallel with the first plane, the rotor body being rotatable in the second plane in response to the electromagnetic fields applied across a planar gap sandwiched between the planar rotor body and the electromotive force means.

2. A planar micro-motor comprising:
   a substrate;
   a plurality of micro-coils arrayed in a first plane, circumferentially spaced about a center point, supported by the substrate;
   rotor means for rotation in response to electromotive force generated by the micro-coils, comprising a rotor shaft having a longitudinal axis of rotation intersecting the first plane at the center point, and a rotor body integral with the rotor shaft and having a plurality of magnetic regions circumferentially spaced about the shaft in a second plane substantially parallel to the first plane; and
   energizing means for selectively passing electrical current to the micro-coils to generate said electromotive force, the electromagnetic force generated by each micro-coil being out of phase with the electromotive force of each micro-coil adjacent to it.

3. The planar micro-motor of claim 2 wherein each of the micro-coils comprises electrically conductive material in a spiral about an axis normal to the first plane.

4. The planar micro-motor of claim 2 wherein the rotor body comprises a plurality of rotor legs extending radially outward from the rotor shaft, one of the magnetic regions being located at the distal end of each rotor leg.

5. The planar micro-motor of claim 2 wherein the rotor body comprises a disk lying in the second plane, the magnetic regions being circumferentially spaced proximate the radially outer periphery of the disk.

6. The planar micro-motor of claim 2 wherein the magnetic regions of the rotor means each comprises a permanent magnet.

7. The planar micro-motor of claim 2 further comprising shielding means for substantially preventing external electromagnetic fields from acting on the magnetic regions of the rotor.

8. The planar micro-motor of claim 2 wherein the energizing means comprises an electrically conductive thin film coating selectively connected as a common ground to each micro-coil through an electrically insulating layer between the micro-coils and the thin film coating.

9. The planar micro-motor of claim 2 wherein the energizing means comprises a plurality of bonding pads and a plurality of electrically conductive leads connecting the bonding pads to corresponding micro-coils, the bonding pads and leads being disposed on an insulating layer over the substrate.

10. The planar micro-motor of claim 9 wherein the energizing means further comprises circuitry means for controlling electrical current to the micro-coils.

11. The planar micro-motor of claim 10 wherein the circuitry means is adapted to receive an externally generated signal and controls the sequence and duration of energization of the micro-coils in response to the externally generated signal.

12. The planar micro-motor of claim 10 wherein the circuitry means is supported by the substrate.

13. The planar micro-motor of claim 2 wherein the substrate forms pocket bearing means for receiving an end of the rotor shaft.

14. The planar micro-motor of claim 2 further comprising ground bearing means for receiving the rotor shaft, being disposed in the first plane and extending to the second plane, to maintain the magnetic regions of the rotor means axially spaced from the micro-coils.

15. The planar micro-motor of claim 2 further comprising position sensor means for sensing the rotational position of the rotor means.

16. The planar micro-motor of claim 15 wherein the position sensor means comprises capacitor electrodes disposed in the first plane.

17. A method of batch fabricating a plurality of planar micro-motors, comprising the steps of:
   providing a micro-machinable substrate having an electrically insulating upper surface;
   depositing a metal layer onto said electrically insulating upper surface;
   depositing an etch mask layer onto the metal layer, the etch mask having a pattern repeated once for each of said plurality of planar micro-motors;
   depositing a photoresist layer onto the etch mask layer and patterning the photoresist layer for a rotor axle end bearing for each of said plurality of planar micro-motors;
   patterning the etch mask to provide vias for each of the rotor axle end bearing and removing corresponding material of the photoresist layer to open the vias;
   micromachining the substrate through the vias to form the rotor axle end bearings;
   depositing and patterning a lower photoresist layer followed by electroplating to form bonding pads and metal traces for power leads;
   depositing an upper photoresist layer onto the lower photoresist layer and opening vias therethrough;
   forming micro-coils in a first plane on the upper photoresist layer;
   removing photoresist material from the upper and lower photoresist layers to expose the bonding pads and the rotor axle end bearings to form a substrate sub-assembly; and assembling a rotor means to the substrate sub-assembly, said rotor means comprising a rotor shaft having a lower end seated in the rotor axle end bearing and a rotor body integral with the rotor shaft and having a plurality of magnetic regions circumferentially spaced in a second plane parallel to the first plane.

18. The planar micro-motor of claim 2 wherein the magnetic regions of the rotor means each comprises magnetically soft material, and the micro-motor is a variable reluctance micro-motor.

* * * * *